(12) United States Patent
Natanzon

(10) Patent No.: US 8,725,691 B1
(45) Date of Patent: May 13, 2014

(54) DYNAMIC LUN RESIZING IN A REPLICATION ENVIRONMENT

(75) Inventor: Assaf Natanzon, Ramat-Gan (IL)

(73) Assignee: EMC Corporation, Hopkinton, MA (US)

( * ) Notice: Subject to any disclaimer, the term of this patent is extended or adjusted under 35 U.S.C. 154(b) by 537 days.

(21) Appl. No.: 12/969,903

(22) Filed: Dec. 16, 2010

(51) Int. Cl.
G06F 7/00 (2006.01)
G06F 17/00 (2006.01)

(52) U.S. Cl.
USPC .......................................... 707/640

(58) Field of Classification Search
None
See application file for complete search history.

(56) References Cited

U.S. PATENT DOCUMENTS

| 7,516,287 | B2 * | 4/2009 | Ahal et al. ..................... 711/162 |
| 8,261,068 | B1 * | 9/2012 | Raizen et al. ................. 713/165 |
| 2003/0023811 | A1 * | 1/2003 | Kim et al. ..................... 711/114 |
| 2003/0131182 | A1 * | 7/2003 | Kumar et al. ...................... 711/5 |
| 2003/0188114 | A1 * | 10/2003 | Lubbers et al. ............... 711/162 |
| 2005/0228835 | A1 * | 10/2005 | Roa ............................... 707/204 |
| 2006/0182050 | A1 * | 8/2006 | Dohm .......................... 370/312 |
| 2007/0180167 | A1 * | 8/2007 | Tan et al. ........................ 710/74 |
| 2010/0082715 | A1 * | 4/2010 | Dohm et al. ................... 707/822 |

* cited by examiner

*Primary Examiner* — Taelor Kim
(74) *Attorney, Agent, or Firm* — Krishnendu Gupta; Joseph D'Angelo

(57) ABSTRACT

A method, system and program product for dynamically changing the size of a LUN in a replication based environment, the replication environment having a splitter, a production site and a replication site, the production site having a production LUN, the replication site having a journal and a replication LUN, comprising changing the LUN size on the production site based on a request to change the size of the LUN on the production site, determining on the replication site that the LUN on the production site has changed size, determining whether it is possible to change the size of the replication LUN, based on a negative determination and in response to a request for the replication LUN, pausing replication, and based on a positive determination, changing or faking the size of the replication LUN.

17 Claims, 25 Drawing Sheets

DYNAMIC LUN RESIZING IN A REPLICATION ENVIRONMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION

This U.S. Patent application is related to an application with Ser. No. 12/969,888 entitled "POINT IN TIME ACCESS IN A REPLICATION ENVIRONMENT WITH LUN RESIZING" being filed on even date to inventor Assaf Natanzon and assigned to EMC Corporation of Hopkinton, the same assignee as this application.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data. Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling roll-back of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system and program product for dynamically changing the size of a LUN in a replication based environment, the replication environment having a splitter, a production site and a replication site, the production site having a production LUN, the replication site having a journal and a replication LUN, comprising changing the LUN size on the production site based on a request to change the size of the LUN on the production site, determining on the replication site that the LUN on the production site has changed size, determining whether it is possible to change the size of the replication LUN, based on a negative determination and in response to a request for the replication LUN, pausing the replication, and based on a positive determination, changing or faking the size of the replication LUN.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
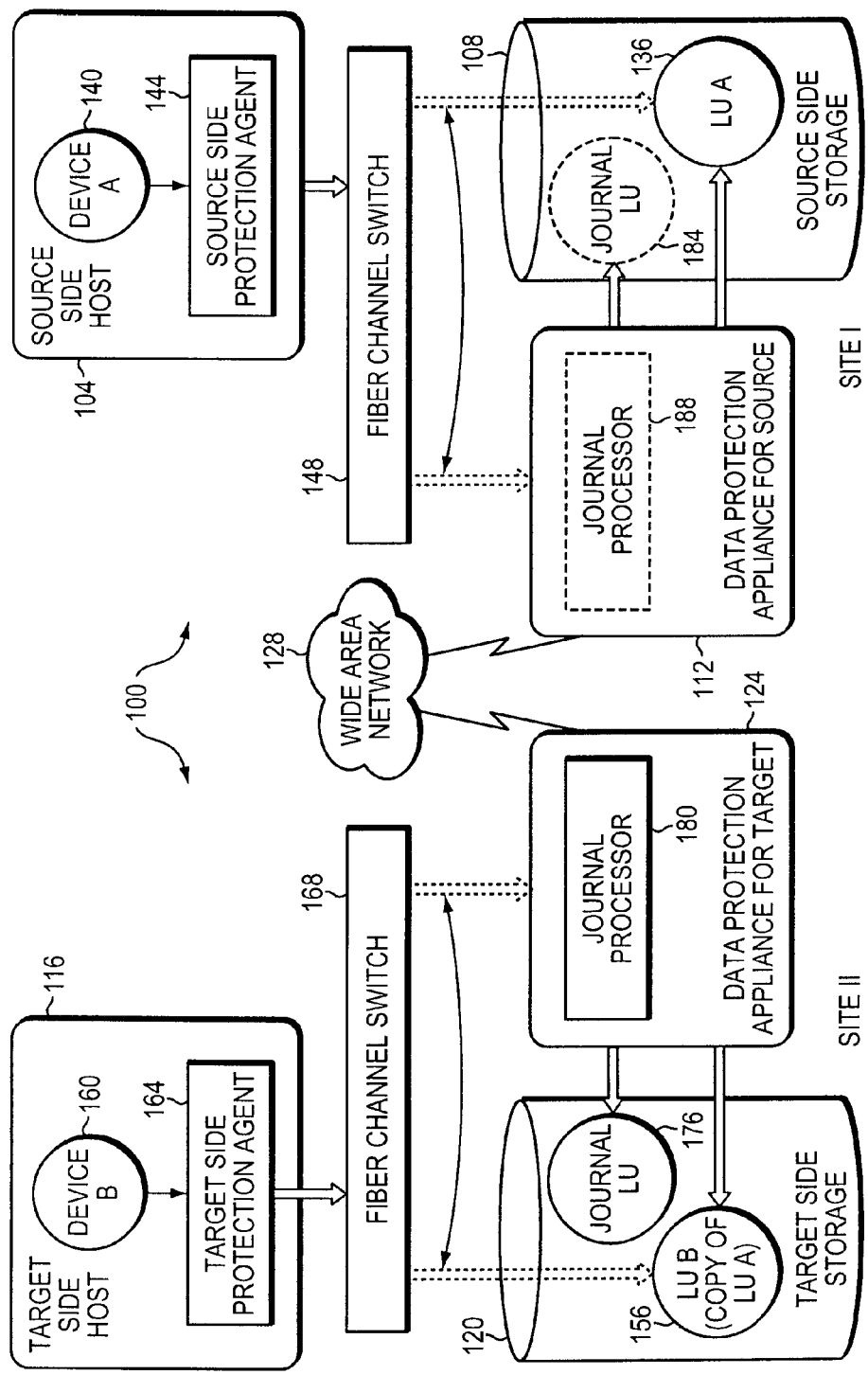
FIG. 1 is a simplified illustration of a data protection system, in accordance with an embodiment of the present invention.

Generally, a user may want to increase or decrease the size of a LUN in a data storage environment. A user may desire this to shrink the amount of storage needed or increase the storage. Typically, storage arrays today support dynamic LUN resizing which include shrinking and expanding of LUNs. However, conventional replication of dynamic LUNs is complex. Further, it is generally even more difficult to replicate dynamic LUNs when journaling is available. Usually, the journal in a replication environment would be lost when a LUN is resized and this would require a complete sweep of the changed volume. Conventionally this was because an application may be given a write space which begins 198k from the end of a LUN. Typically if the LUN size has increased, 198k from the end of the LUN is now in a different location on the LUN. Generally, this would result in a different application space and if the application is not made aware of the LUN resize then the application would attempt to access data at an incorrect portion of the LUN.

In some embodiments of the current disclosure, a user may change the size of a LUN in a consistency group while replicating with a journal. In certain embodiments, when the user asks for a point in time of the replication, the replication system will fake the LUNs sizes to the size they were during the required point in time. In at least some embodiments, the journal may not be lost when a LUN is resized, and user can undo the LUN resize. In further embodiments, the replication engine may automatically resize the LUNs on the replica site or ask the user to increase LUN size when needed. In at least some embodiments, this enables LUNs to be resized without the loss of a journal and complete resynchronization of the volumes.

The following definitions may be useful in understanding the specification and claims but are not meant to be limiting.

BACKUP SITE—may be a facility where replicated production site data is stored; the backup site may be located in a remote site or at the same location as the production site;

CLONE—may be a clone may be a copy or clone of the image or images, drive or drives of a first location at a second location DELTA MARKING STREAM—may mean the tracking of the delta between the production and replication site, which may contain the meta data of changed locations, the delta marking stream may be kept persistently on the journal at the production site of the replication, based on the delta marking data the DPA may know which locations are different between the production and the replica and transfers them to the replica to make both sites identical.

DPA—may be a computer or a cluster of computers that serve as a data protection appliance, responsible for data protection services including inter alia data replication of a storage system, and journaling of I/O requests issued by a host computer to the storage system;

HOST—may be at least one computer or networks of computers that runs at least one data processing application that issues I/O requests to one or more storage systems; a host may be an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

MARKING—may mean the tracking of changes to the data;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period. Snapshots may be taken by an array service which may be called an array based snapshot.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference. A description of an example of virus checking using journaling data may be described in the patent application title "METHODS AND APPARATUS FOR VIRUS DETECTION USING JOURNAL DATA" filed on Dec. 26, 2007 with Ser. No. 11/964,138, which is hereby incorporated by reference. A description of an example of consistency may be described in the patent application title "ENSURING CONSISTENCY OF REPLICATED VOLUMES" filed on Sep. 28, 2009 with Ser. No. 12/568,203, which is hereby incorporated by reference. A description of an example of marking and virtual consistency groups may be described in the patent application title "VIRTUALIZED CONSISTENCY GROUP USING AN ENHANCED SPLITTER" filed on Sep. 27, 2010 with Ser. No. 12/890,923 which is hereby incorporated by reference. A description of an example of accessing virtual consistency groups may be described in the patent application title "A VIRTUALIZED CONSISTENCY GROUP USING MORE THAN ONE DATA PROTECTION APPLIANCE" filed on Sep. 27, 2010 with Ser. No. 12/890,928 which is hereby incorporated by reference. A description of an alternative example of accessing virtual consistency groups may be described in the patent application title "VIRTUALIZED CG" filed on Dec. 26, 2009 with Ser. No. 12/647,450 which is hereby incorporated by reference.

Description of Embodiments Using of a Five State Iourning Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
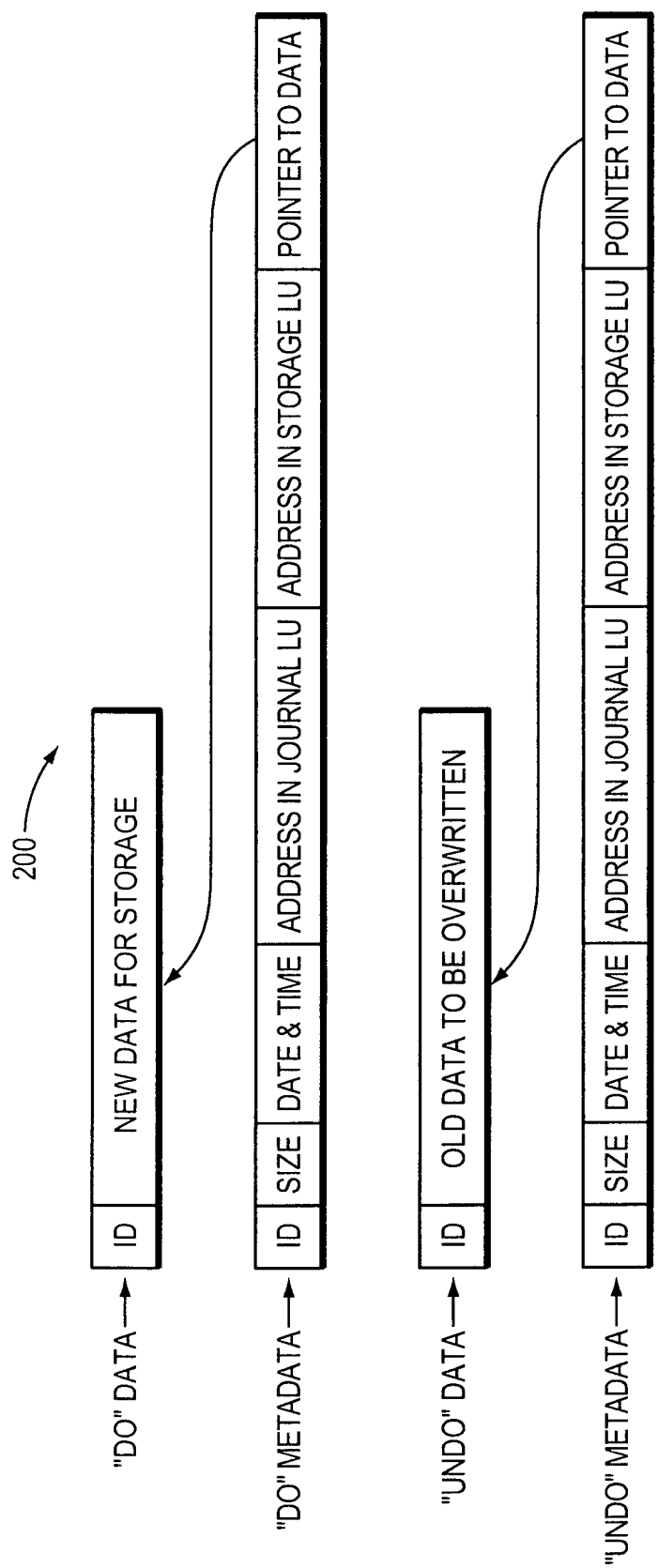
FIG. 2 is a simplified illustration of a write transaction for a journal, in accordance with an embodiment of the present invention.
Figure 3:
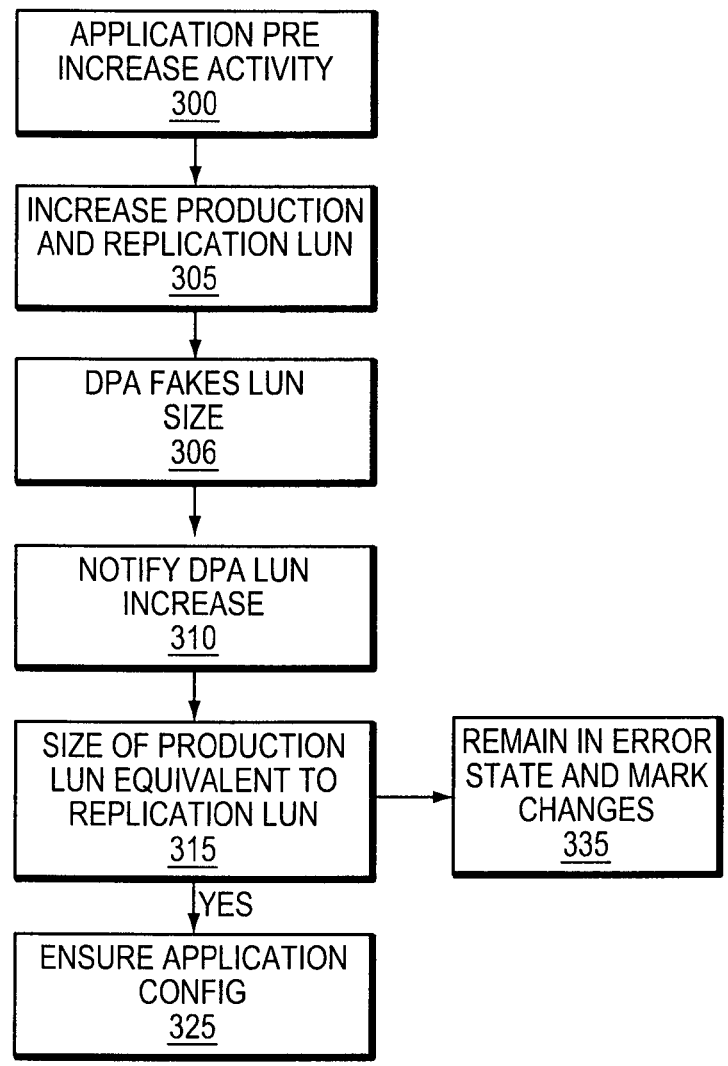
FIG. 3 is a simplified method for increasing the size of a LUN during replication, in accordance with an embodiment of the present invention.
Figure 4:
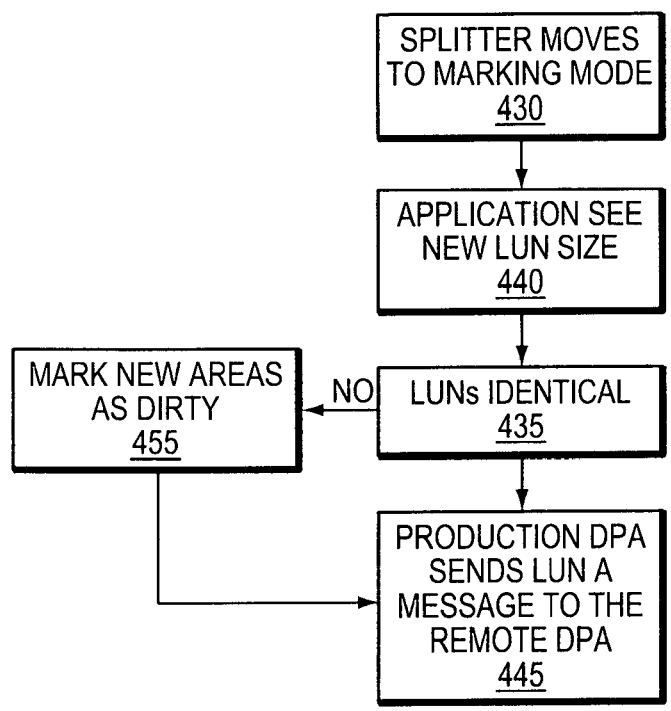
FIG. 4 is another simplified method for increasing the size of a LUN during replication, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access Section

Before describing exemplary embodiments of the invention, some information is provided for conventional continuous data protection systems having journaling and a replication splitter. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter minors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiment in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes will be handled through the DPA. The host may read the undo data of the write and the appliance will store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica will be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Dynamic Volumes Support:

As used herein the term LUN may refer to a set of LUNs or a single LUN. In a replication environment with journaling, it may be beneficial to increase or decrease the size of a LUN without losing the journal data. For a LUN to be resized using typical journal based replication the old LUN may need to be removed and the new, resized LUN added. Generally, this requires that the new LUN be rescanned by the replication. Conventionally, it may be necessary for an application to be aware of the size of the LUN as the application may access storage by the size and geometry of the LUN.

In some embodiments, the current disclosure enables a LUN to be resized to be larger or smaller without losing the journal data and requiring a refresh of the volumes. In certain embodiments, the LUN or volume resize will be a manual process executed by a user. In alternative embodiments, an application, such as EMC's Celerra, may request the LUN be resized. In at least some embodiments, the LUN may be increase in size. In other embodiments, the LUN may be decreased in size.

In certain embodiments, a user may manually change the size of a LUN. The user may report a GUI or a CLI or any API on the LUN size change. In an embodiment where volume expansion has occurred, there may be an initialization of the new LUN area. In further embodiments, the system may allow volume shrinking on the production site and fake volume shrinking on the replication site to enable a LUN resize without journal loss. In further embodiments, the current disclosure enables access to virtual images and virtual LUNs. In another embodiment, the current disclosure enables the replication to be rolled forward and backward in time using the journal although the LUN may sized differently at different points in time. When accessing a point in time, the system may expose the LUN size as it was originally at the relevant point in time.

LUN Size Increases

In some embodiments, there may be a request to increase the LUN size. A LUN size increase may present complexities in that the journal, applications, and replica may have a smaller LUN on which they operate. To increase the LUN size on the application, the replica LUN may need to be increased, the journal may need to mark this change, and the applications may need to be aware of the change. For example, if the LUN size on the replica was not increased and an IO was sent to the replica site which is out of bounds of the smaller LUN, an error may occur. As well, conventionally certain applications may denote the portion of the LUN to which data is read and written in terms of the size and geometry of the LUN, if the LUN size and geometry were to change, the application may not function correctly.

In some embodiments, a LUN may be resized on the production site. In certain embodiments, the replica LUN may also be increased. The size presented to the production site may be "faked" to be the old size. In certain embodiments, the production site may perform some preconditions to ensure that the applications on the production site are aware of the change in size of the LUN. In some embodiments, the Replication appliance may be told of the resize request.

In certain embodiments, after replication the appliance may be told of the resize and the faking of size of the production volume size may be stopped and the application may see the new size, there may be some post resize application activity. In some embodiments, the production appliance may send the remote DPA a message stating the LUN size changed, and the remote appliance may track the change in the metadata journal. In certain embodiments, the splitter may intercept a request to resize the LUNs and go into marking mode, recording the IO but not sending the changes to the replica site.

In at least some embodiments, the replica and production LUN sizes may be compared. In some embodiments, it may be determined that this is a clean increase in that the LUNS are known to be identical as the new area on the LUNS is identical on both sites. In these embodiments, the LUNs on both replica and production site may be increased. In these embodiments, the splitter may resume sending the IO to the DPAs and resume the replication.

In other embodiments, the area of the increase may not be identical on the production and replication sites (i.e. it is not an identical expansion). In these embodiments, if the sizes are not identical, the replication may be paused. In some embodiments where the data in the new areas is not identical, the new areas may be marked dirty in the delta marking stream so the areas may be rescanned and differences between production and replica site transferred to the replica site. In most embodiments when a volume size change is detected, the replication may be paused. In certain embodiments, the LUN may be increased and the replication may continue and a short initialization may happen, which will make sure the production and replica site are identical.

Refer now to the example embodiments of FIGS. 3, 4, 7, and 8. In these embodiments, there has been a request to increase the LUN size. In these embodiments, applications 711 may be dependant on the size and or geometry of the LUN 710. Thus, in these embodiments, application pre-increase activity is performed on the applications 711 (step 300). LUNs 710 and 725, on production and replication sites 705, 715 are increased in size in the storage array (step 305), DPA 712 will fake the LUN sizes to the original LUN size so that hosts will still see the original LUN size (step 306). DPA 712 is notified of the change (step 310), and notified if the new areas added to the production and replica LUNs are identical.

Splitter 807 moves to marking mode (step 430) and exposes the LUN in it new size. Applications 811 on production site 805 see the new LUN 810 size (step 440). The user may tell DPA if LUNs are identical (step 435). If LUNs, 810, 825 are not identical, the non-identical area is marked as dirty in marking stream 808 (step 455). Production DPA 805 sends a LUN resize message 830 to remote DPA 812 and the message is tracked in remote journal 820 (step 445). Message 830 may include a timestamp of the change of the ID of the LUN and the old and new size of the LUN. Replication is resumed if remote LUN 825 size is at least as big as production LUN 810 size (step 315). In certain cases if LUNs, 805, 815 are not equivalent, or if LUN 815 is smaller than LUN 805, the replication remains in error state and just tracks the changes to the production volume (step 335). Post increase activity is performed on the applications (step 325).

Figure 5:
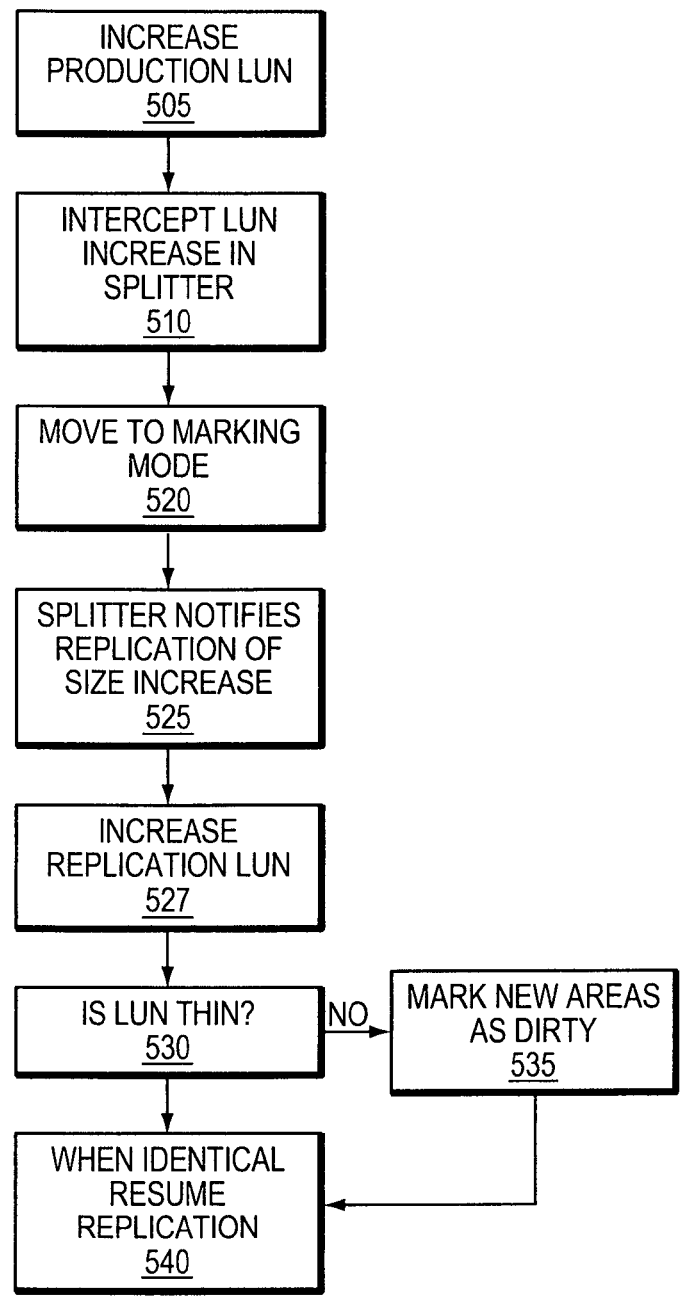
FIG. 5 is an alternative simplified method for increasing the size of a LUN during replication, in accordance with an embodiment of the present invention.
Figure 7:
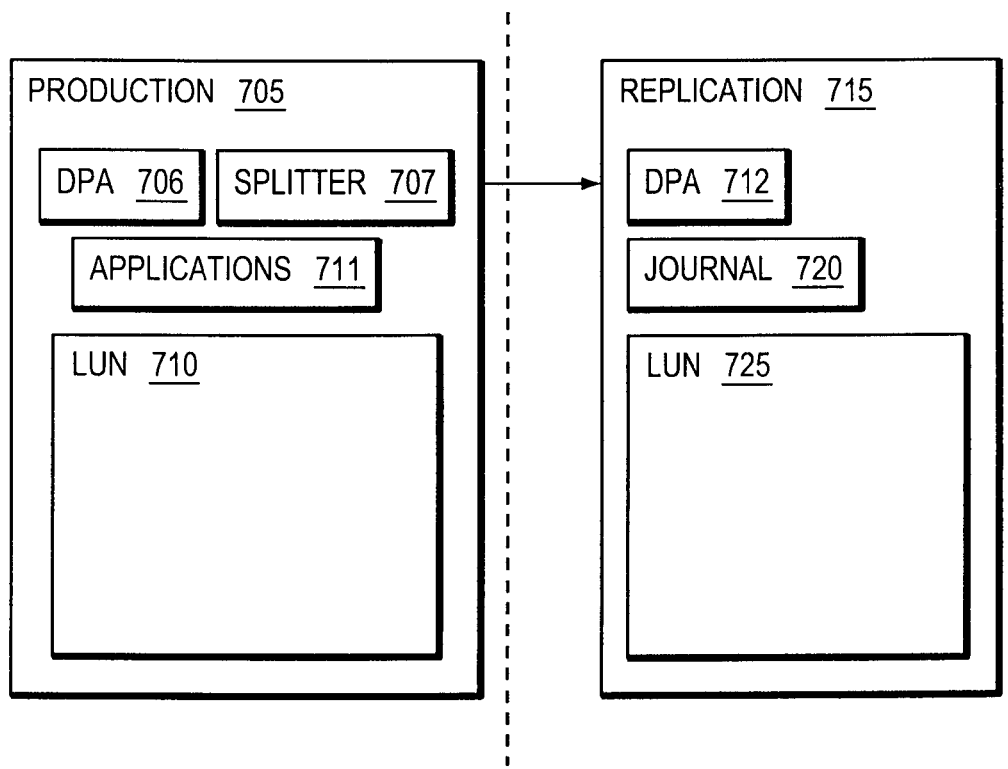
FIG. 7 is a simplified illustration of a data protection system, in accordance with an embodiment of the present invention.
Figure 8:
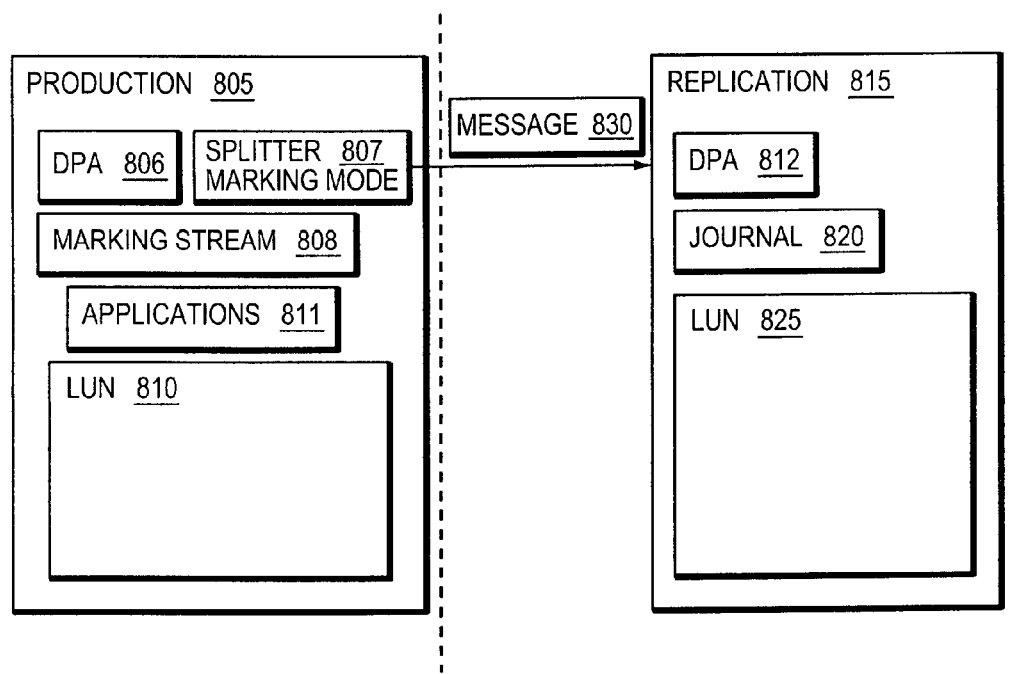
FIG. 8 is a simplified illustration of a data protection system illustrating a marking stream, in accordance with an embodiment of the present invention.
Figure 9:
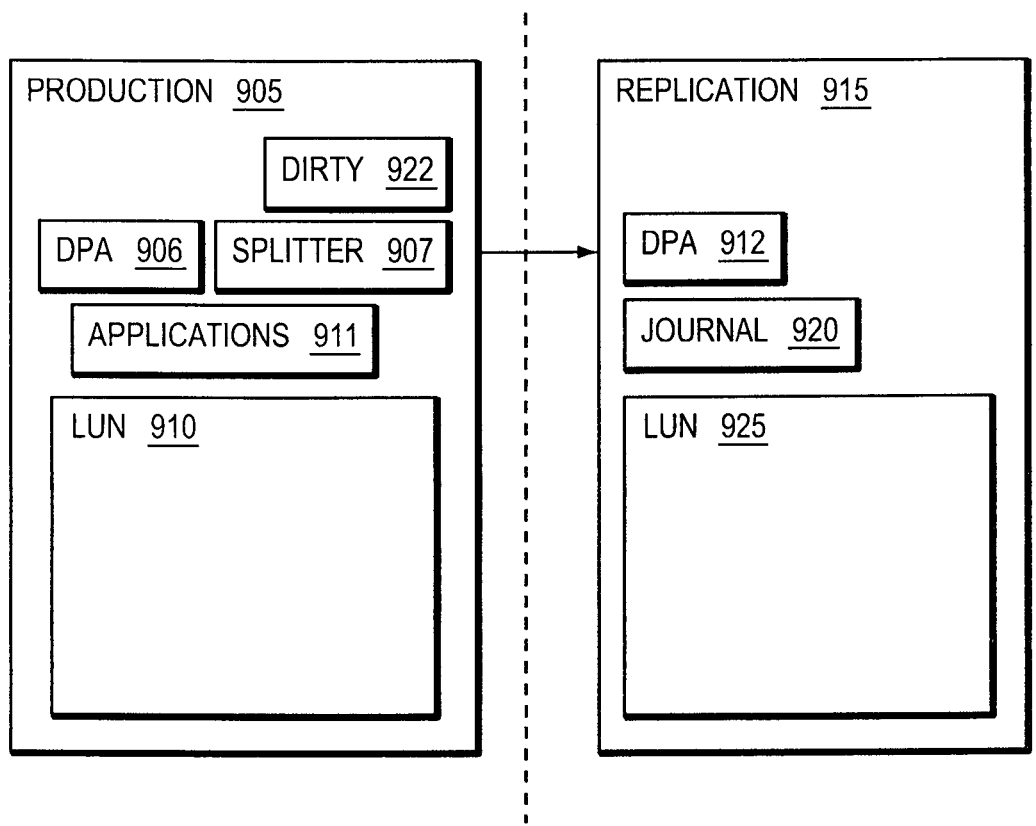
FIG. 9 is a simplified illustration of a data protection system illustrating part of the journal marked as dirty, in accordance with an embodiment of the present invention.

Refer now to the example embodiments of FIGS. 5, 7, and 9. In these example embodiments, applications 811 are not sensitive to a LUN increase and can work transparently if the LUN size is increased, and the splitter runs inside the storage array 10 stack. The LUN size of LUN 710 on production site 705 is increased (step 505). Splitter 707 intercepts the LUN increase in splitter 707 (step 510) and moves to marking on splitter mode (step 525). This may track the locations changes and not send data to replication site 715. The splitter 807 notifies DPA 712 of the LUN increase size (step 525). Either remote DPA 712 increases LUN 725 on replica site 715 to the same size as production LUN 710, or user increases replica LUN size (step 527). If LUNs 710 and 725 are thinly provisioned on both replication site 715 and production site 705, the replication may start (step 530). If there is not thin provisioning, the newly added area of the LUN will be marked as dirty in delta marking stream 922 (step 535). Replication may start the replication process may ensure the LUNs are identical with its init process.

Figure 6:
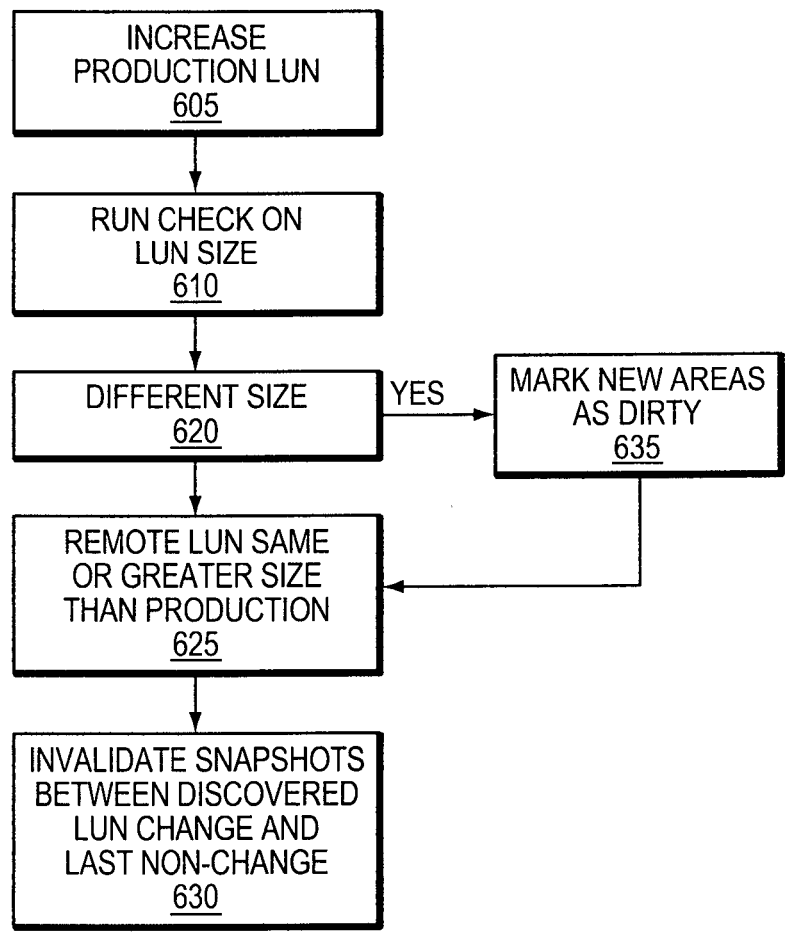
FIG. 6 is a further alternative simplified method for increasing the size of a LUN during replication, in accordance with an embodiment of the present invention.
Figure 10:
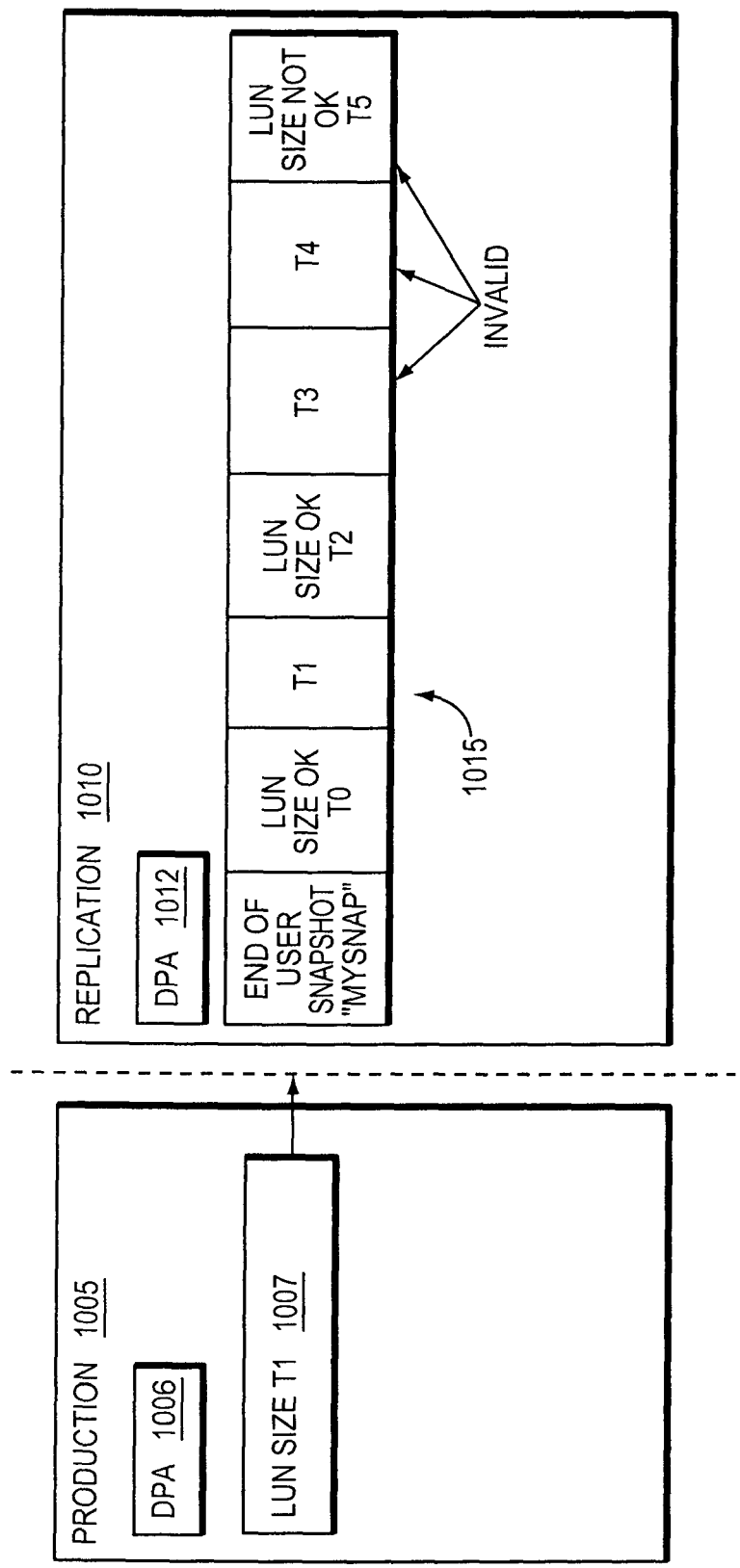
FIG. 10 is a simplified illustration of a data protection system illustrating a journal with invalid data, in accordance with an embodiment of the present invention.

Refer now to the embodiments of FIGS. 6, 7, and 10. In these further example embodiments, the LUN size of LUN 710 may be increased on production site 705 (step 605). The DPA periodically checks LUN sizes (step 610), if the LUN size is different (step 620), the replication may be paused and the new area may be marked dirty in the delta marking stream on the production site (step 635). The Replication sends the remote DPA 712 a message that the LUN size changed, the message is tracked in remote journal 720. If remote volume 725 is larger or equal to production volume 710, the replication is started with the new LUN sizes (step 625). The snapshots between the check which discovered the LUN size changes and the last check where LUN size did not change are invalidated (step 630). Refer now to the example embodiment of FIG. 10. Journal 1015 of FIG. 10 illustrates an example journal tracking LUN size information. Thus, step 630 may be applied to invalidate times T3, T4, and T5 in journal 1015.

LUN Size Decreases

Typically, LUN size decreases may also present complexities for Journal based replication. In general, if a LUN is decreased on a replication site, the journal may contain IO for a portion of the LUN that is now out of bounds, i.e. in an area of the de-allocated LUN. Similarly, typical applications which mark their LUN space by the geometry and size of the LUN may also not function correctly if the LUN is resized.

In some embodiments, a request may be made to shrink the production LUN, which is being replicated. In certain embodiments, the production site may perform some configuration to ensure that the applications work with the new LUN size. In certain embodiments, a shrink command may be sent to the splitter and replication appliance. In certain embodiments, the replication appliance may "fake" a reduction of the LUN size.

In certain embodiments, the LUN on the production site may be reduced and the splitter and journal on the replication site maybe notified of the reduction. In these embodiments, however, the LUN size on the replication may not be shrunk. In these embodiments, this may be because there is information in the journal that relates to the larger LUN size. In some embodiments, the LUN size on the replication may not be reduced until the snapshots have been aged and removed.

In some embodiments, the replica site may scan the journal to determine when there are no snapshots that refer to the larger LUN size. When the snapshots no longer reference the larger LUN size, the replication LUN may be reduced.

In alternative embodiments, if automatic volume resizing is supported, a shrink command may be added to the remote journal. In certain embodiments, before applying the shrink command, the data to be shrunk may be copied to the UNDO stream. In some embodiments, an increase size command may be put in the undo stream, and the volume size may be decreased.

Figure 11:
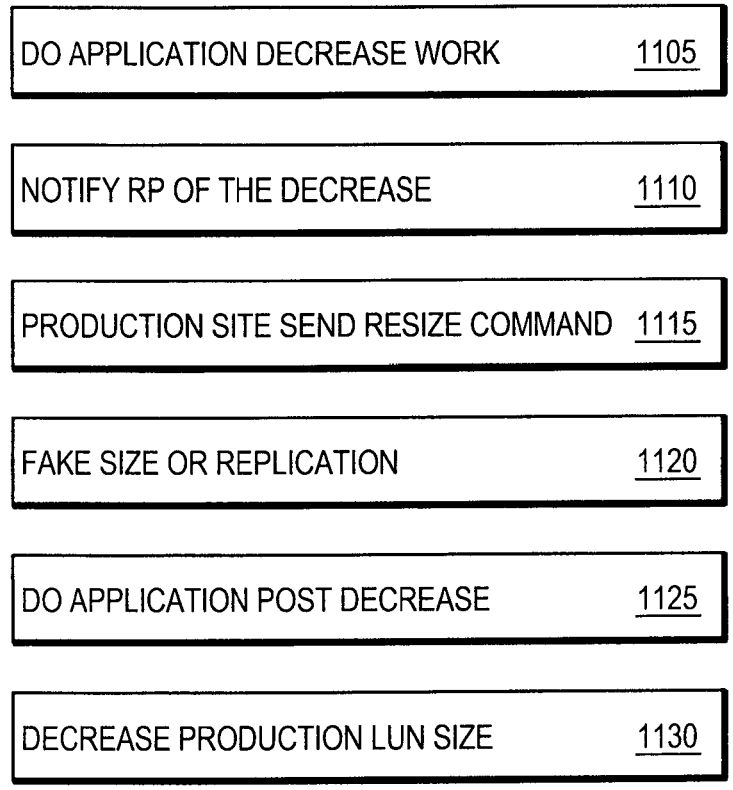
FIG. 11 is a simplified method for decreasing the size of a LUN during replication, in accordance with an embodiment of the present invention.
Figure 12:
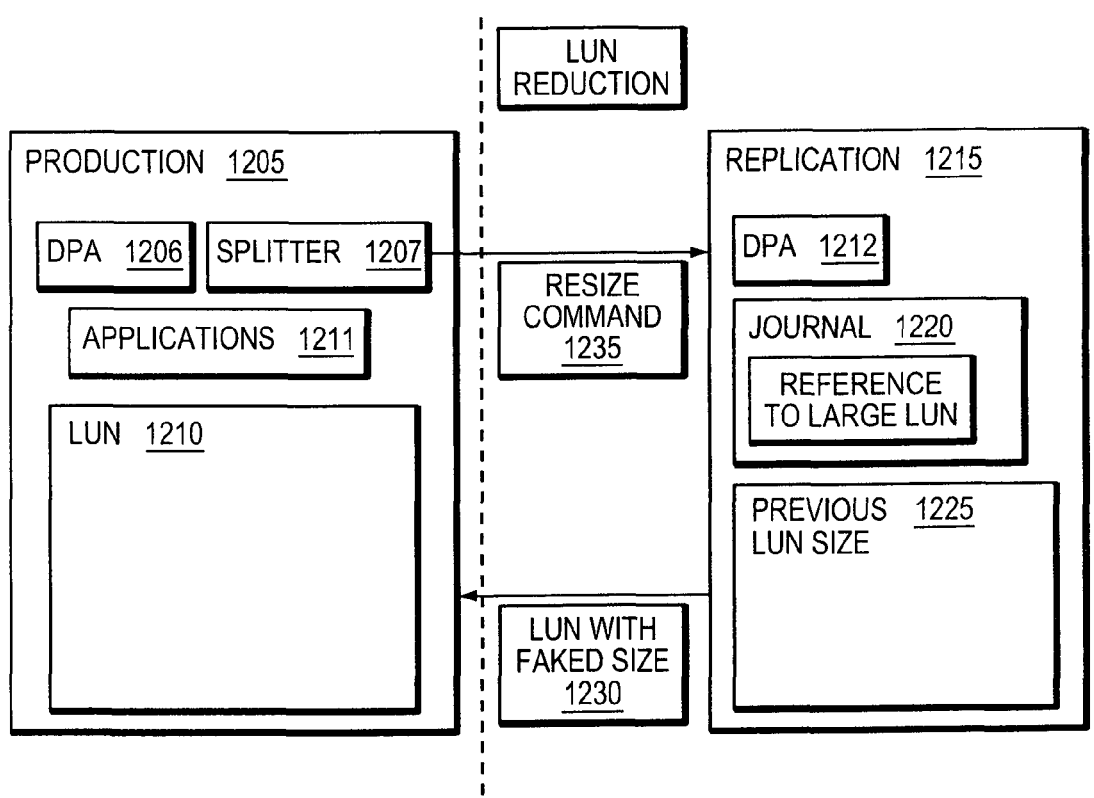
FIG. 12 is a simplified illustration of a data protection system illustrating presentation of a faked LUN size, in accordance with an embodiment of the present invention.

Refer to the example embodiments of FIGS. 11 and 12. In these embodiments, applications 1211 may be sensitive to the size of the LUN. In these embodiments, work is performed on applications 1211 to ensure applications 1211 are ready for the LUN reduction (step 1105). The Production DPA 1205 is notified of the LUN size decrease (step 1110). Production DPA 1206 sends a resize command to remote DPA 1212 (step 1115) and tracks it in journal 1220 (the command may include new and old size and new and old geometry). Splitter 1207 fakes the LUN size (step 1120), and applications 1211 see the smaller LUN. Application post decrease configuration is performed (step 1125). The LUN size may be reduced on the production storage 1205 (step 1130).

Figure 13:
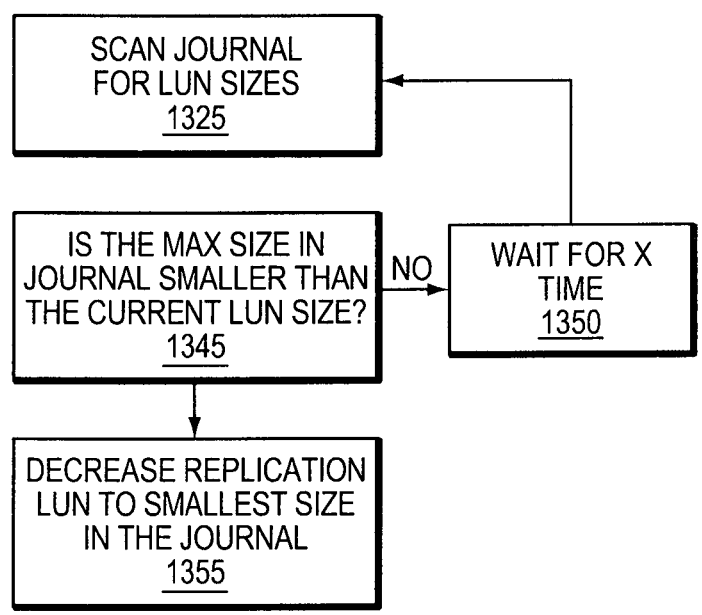
FIG. 13 is a simplified method for scanning a journal used in a replication environment, in accordance with an embodiment of the present invention.
Figure 14:
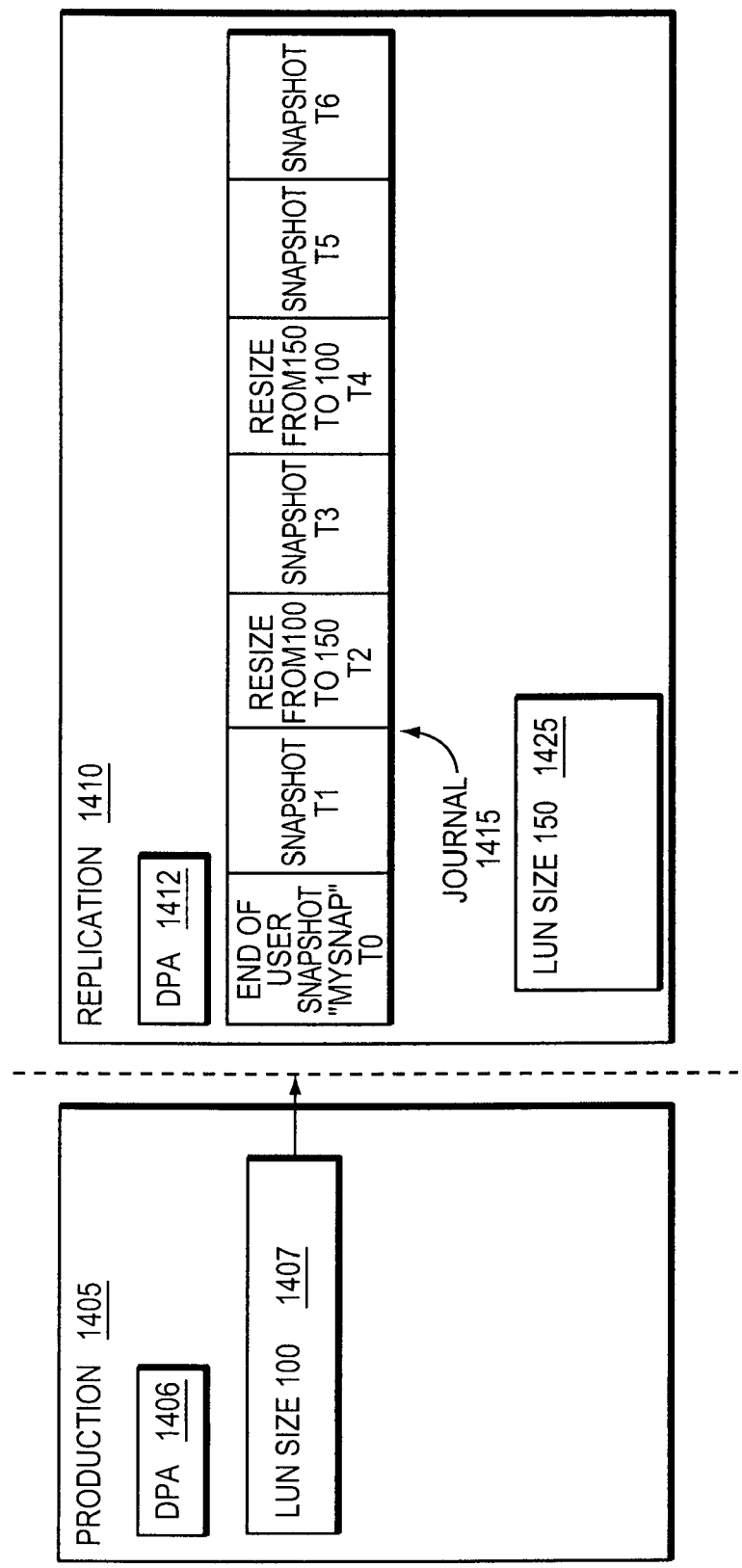
FIG. 14 is a simplified illustration of a data protection system illustrating a journal denoting information about LUN size changes, in accordance with an embodiment of the present invention.
Figure 15:
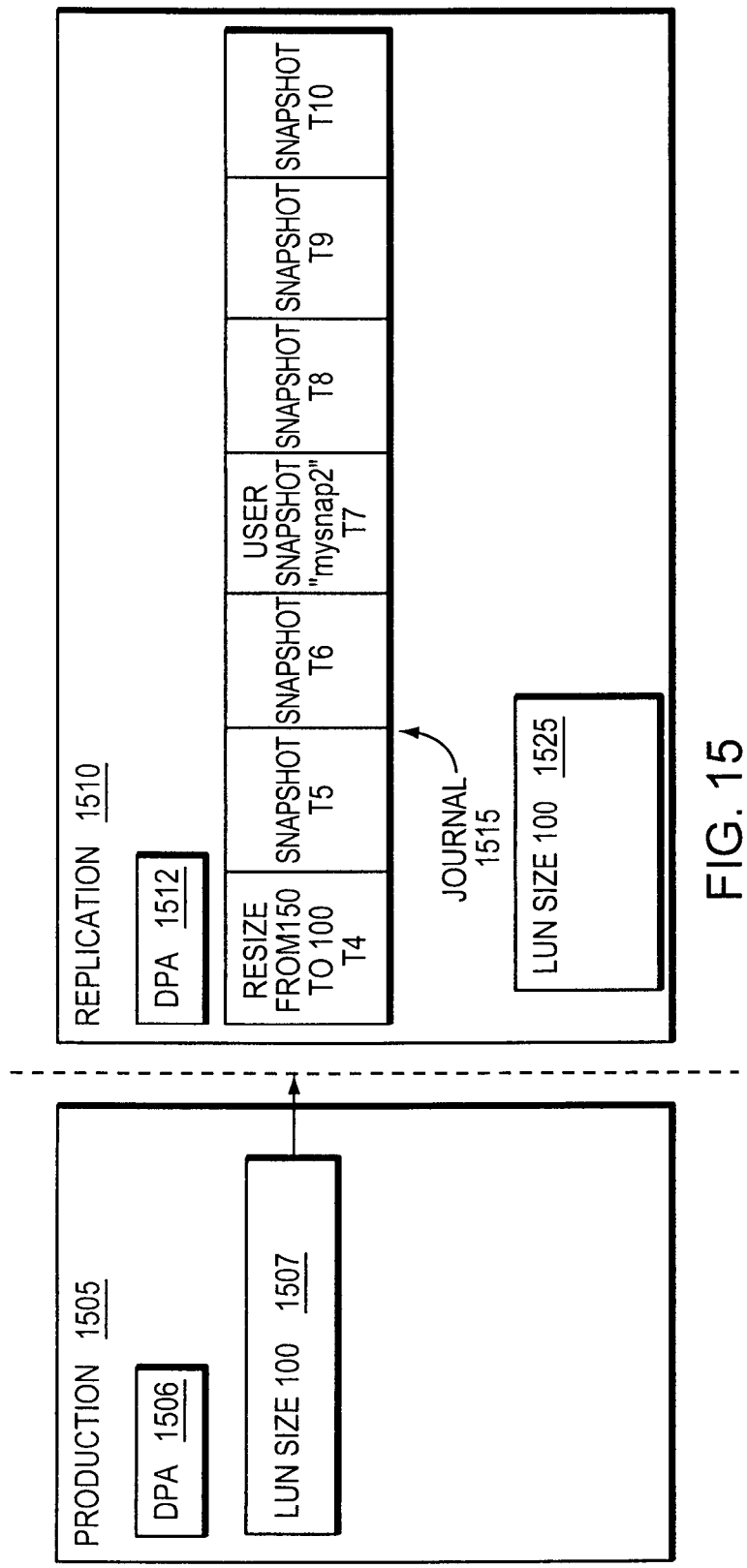
FIG. 15 is an alternative simplified illustration of a data protection system illustrating a journal denoting information about LUN size changes, in accordance with an embodiment of the present invention.

Refer now to the embodiments of FIGS. 13, 14, and 15. In these embodiments, the replication site may periodically scan the metadata journal and find the maximal size of the volume on the replica (step 1325). If the maximum LUN size in the journal is smaller than the current LUN size (step 1345), then it may be possible to reduce the size of the LUN (step 1355). If the max journal LUN size is equal to the current LUN size, then the scanning may pause for time X. Any time period may be chosen for X. As well, it may be possible to inform the user that the LUN size may be reduced instead of reducing the LUN size.

Referring to FIG. 14, Journal 1415 of the embodiment of FIG. 14 has a max LUN size of 150 which is equivalent to the size of LUN 1425. Thus the LUN size of LUN 1425 may not be reduced. In the embodiment of FIG. 15, the max LUN size of journal 1515 is 100 and the LUN size has been reduced from 150 to 100. In further embodiments, the LUN size on the replication may be reduced to the current maximum size in the journal, however this size may be greater than the size of the LUN on the production site.

Figure 16:
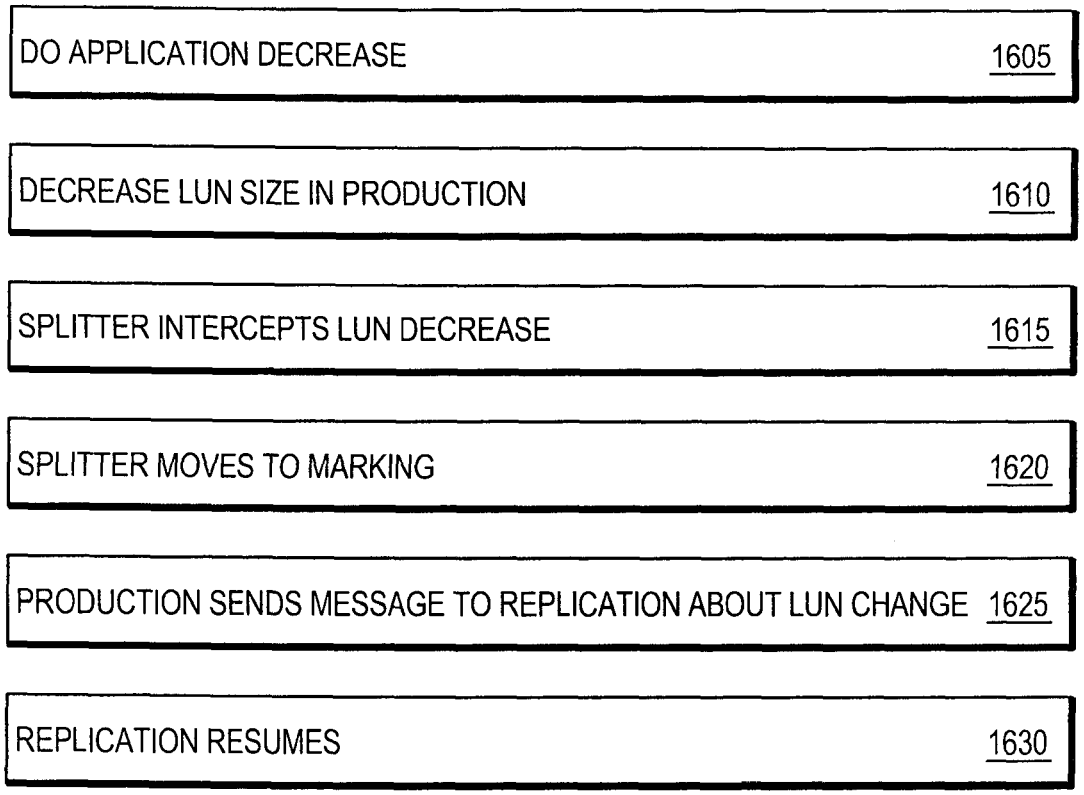
FIG. 16 is a simplified method for decreasing the size of a LUN during replication, in accordance with an embodiment of the present invention.
Figure 17:
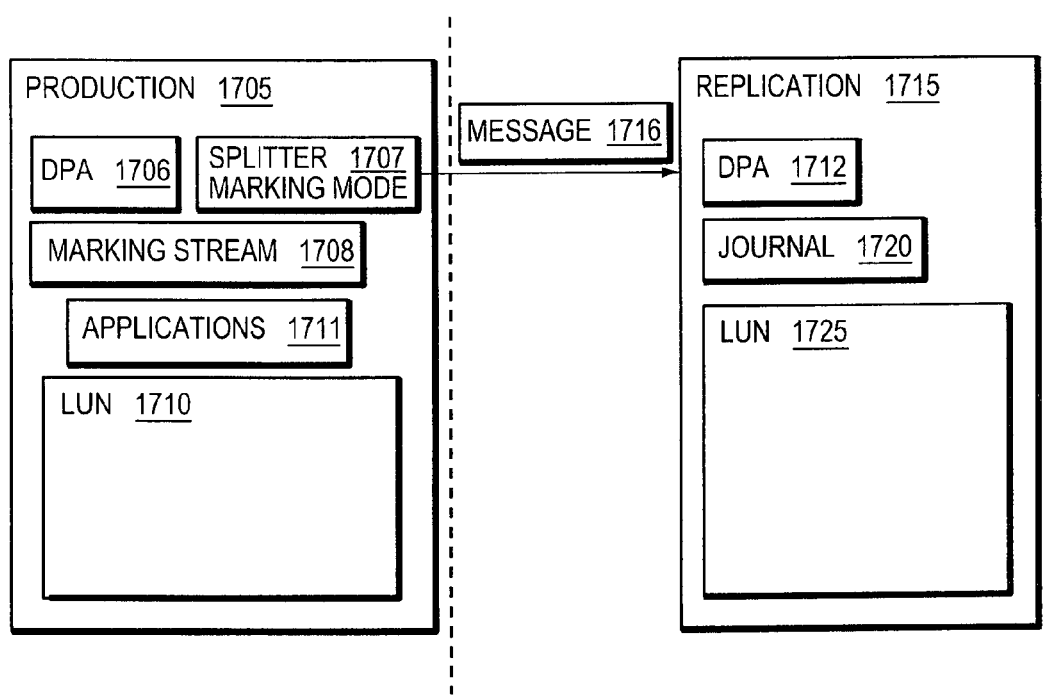
FIG. 17 is a simplified illustration of a data protection system illustrating a marking stream and a splitter in marking mode, in accordance with an embodiment of the present invention.

Refer now to the example embodiments of FIGS. 16 and 17. In the embodiments of FIGS. 16 and 17, the applications 1711 may not be sensitive to the size of the LUN. If applications 1711 are not sensitive and the splitter runs in storage array, pre-decrease work may be performed to ready the applications 1711 (step 1605). The pre-decrease work may enable the application to use the parts of the LUN up to the new size. In some embodiments, application non sensitivity may mean that application may work on larger LUNs. The LUN size may be decreased on the production site 1705 (step 1610). Splitter 1707 intercepts the LUN decrease (step 1615), moves to marking on splitter mode (step 1620), and the replication pauses. Splitter 1707 notifies the DPA 1706 that the LUN 1710 shrunk. The DPA 1706 sends message 1716 to remote DPA 1712 about the LUN 1710 size change (step 1625). The replication resumes (step 1630). In these embodiments, when accessing an image at the remote the LUN size at the remote will be the actual physical LUN and there may be no size faking. In certain embodiments, the remote LUN will decrease after older images referring to the larger LUN size may be removed from the journal. In further embodiments, if a fail over occurs before the LUN is decreased, the LUN size may need to be reduced on the replica.

Figure 18:
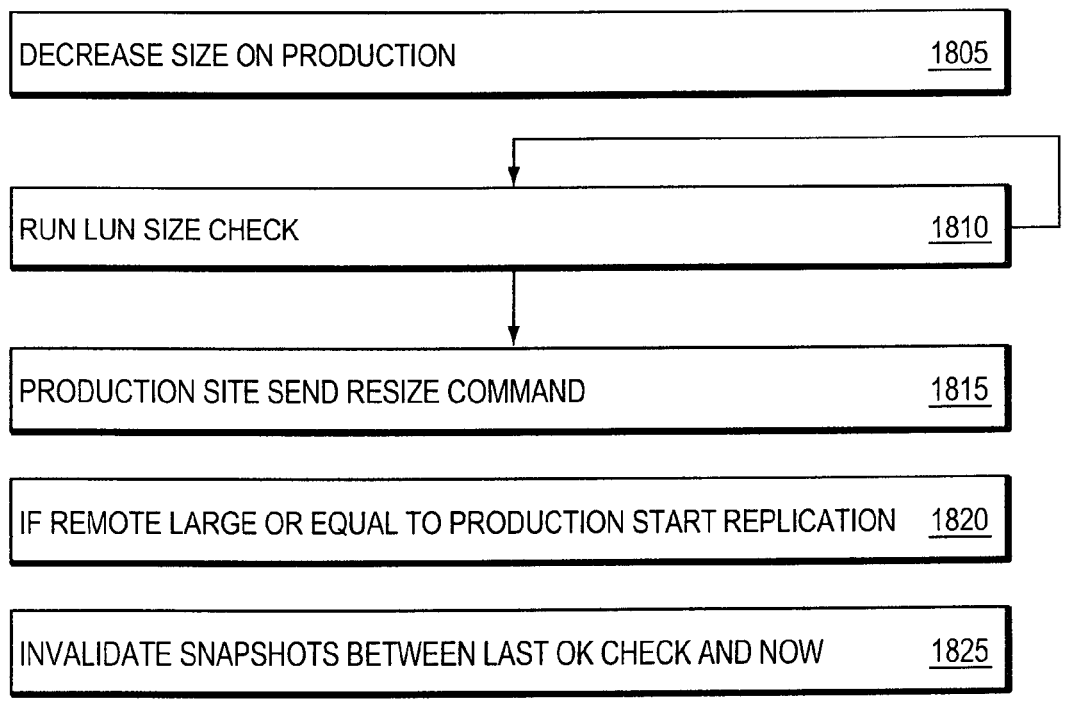
FIG. 18 is an alternative simplified method for decreasing the size of a LUN during replication, in accordance with an embodiment of the present invention.
Figure 19:
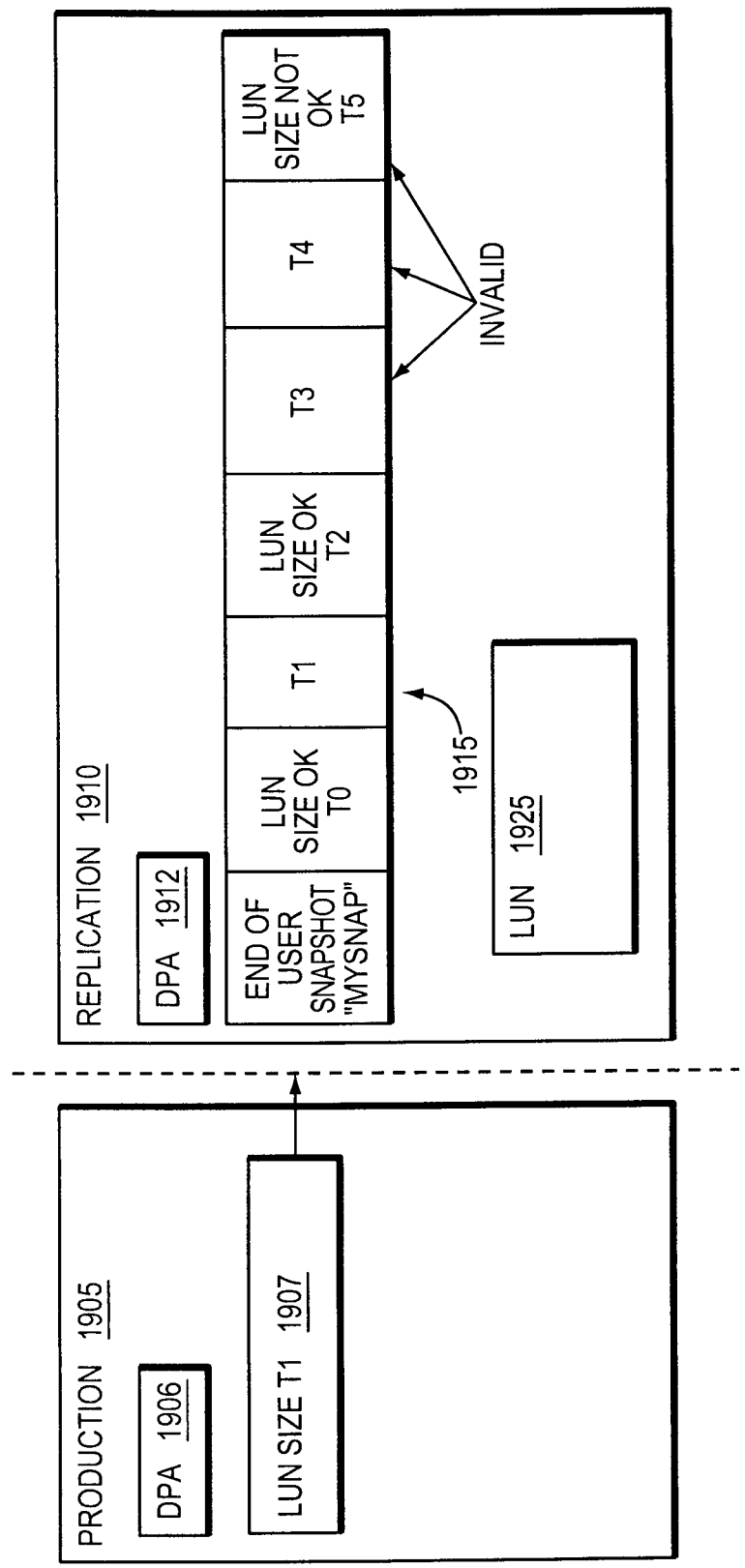
FIG. 19 is a simplified illustration of a data protection system illustrating a journal with invalid snapshots, in accordance with an embodiment of the present invention.

Now refer to the embodiments of FIGS. 18 and 19. In the embodiments of FIGS. 18 and 19, the size of LUN 1907 on production 1905 is reduced (step 1805). The replication periodically checks LUN sizes (step 1810), if the LUN size is different, the smaller replication pauses. RP sends the remote DPA a message that LUN size changed, the message will be tracked in the remote journal (step 1815). The replication starts with the new LUN sizes (step 1820). Snapshots between the check which discovered the LUN size changes and the last check where LUN size did not change, i.e. times T3, T4, and T5, are invalidated (step 1825).

In some embodiments, the undo of a LUN increase may be a decrease in LUN size and the undo of a decrease may be an increase. In certain embodiments, when data is distributed in 5 phase distribution as described above and when a LUN increase command is read from the do meta data stream, a decrease command may be written in the undo meta data stream as the data is distributed or an increase command may be written in the undo meta data stream.

Point in Time Requests

In some embodiments, journal based replication allows the user to access different points in time. This may present a complexity that, when LUNs sizes are shrunk and increased during replication, at different points in time the LUNs may have different sizes. In most embodiments, the replica LUN is be bigger or equal to the production LUN.

In certain embodiments, if the application is self contained and not sensitive for to the LUN size or geometry, the replica LUN may be exposed to the user in its full current size. In these embodiments, the user can choose to access any image, in logged access mode and the system may be enabled to roll to the point in time. In other embodiments, such as in virtual access mode, the system may expose a virtual image of the point in time the user requested, while the replica LUN itself may present a different point in time.

Figure 20:
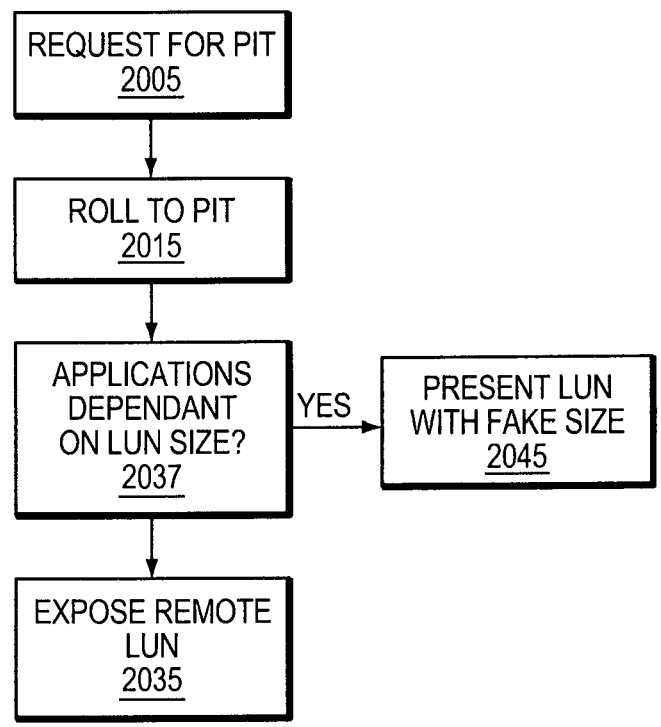
FIG. 20 is a simplified method for rolling to a point in time, in accordance with an embodiment of the present invention.
Figure 21:
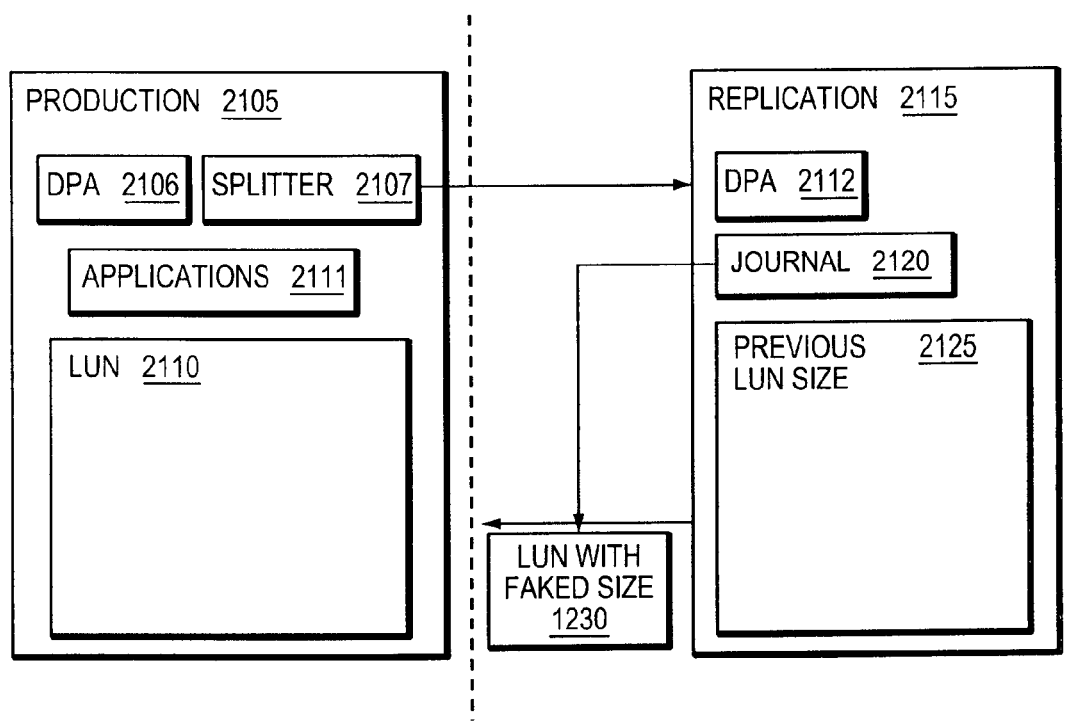
FIG. 21 is a simplified illustration of a data protection system illustrating presentation of a LUN with a faked size, in accordance with an embodiment of the present invention.

Refer now to the embodiments of FIGS. 20 and 21. There is a user request for a point in time access in logged access mode (step 2005). The LUN is rolled to a point in time (2015). If the applications 2111 are sensitive to a change in the LUN (step 2037), the LUN 1230 with the size specified for that point in time in the journal 2120 is exposed (step 2045), otherwise the full remote LUN 2125 is exposed (step 2035).

In some embodiments, if the application is size sensitive when user requests access to a point in time, the application may expect that the LUN size and often the LUN geometry will be identical to the requested point in time. In some embodiments, there may be metadata messages about the size changes in the journal (i.e. do metadata stream and undo metadata stream), and when user requests access to a point in the time, the system knows the size of the LUNS for this point in time. In certain embodiments, the system will than fake the LUN size end expose the application the LUN size (and in some embodiments will also fake the geometry) as existed at this point in time.

In other embodiments, a user may desire to access a virtual point in time. In some embodiments, if application is sensitive to LUN size and geometry, when a user accesses a virtual point in time, the volume size exposed to the application may be smaller than the actual LUN size. In certain embodiments, if user would like to roll the image while accessing the image, the DPA may need to write to locations in the LUN which are out the boundaries of the LUN exposed to the application. In these embodiments, the LUN size exposed to the DPA may be different (bigger) than the LUN size exposed to the user.

Figure 22:
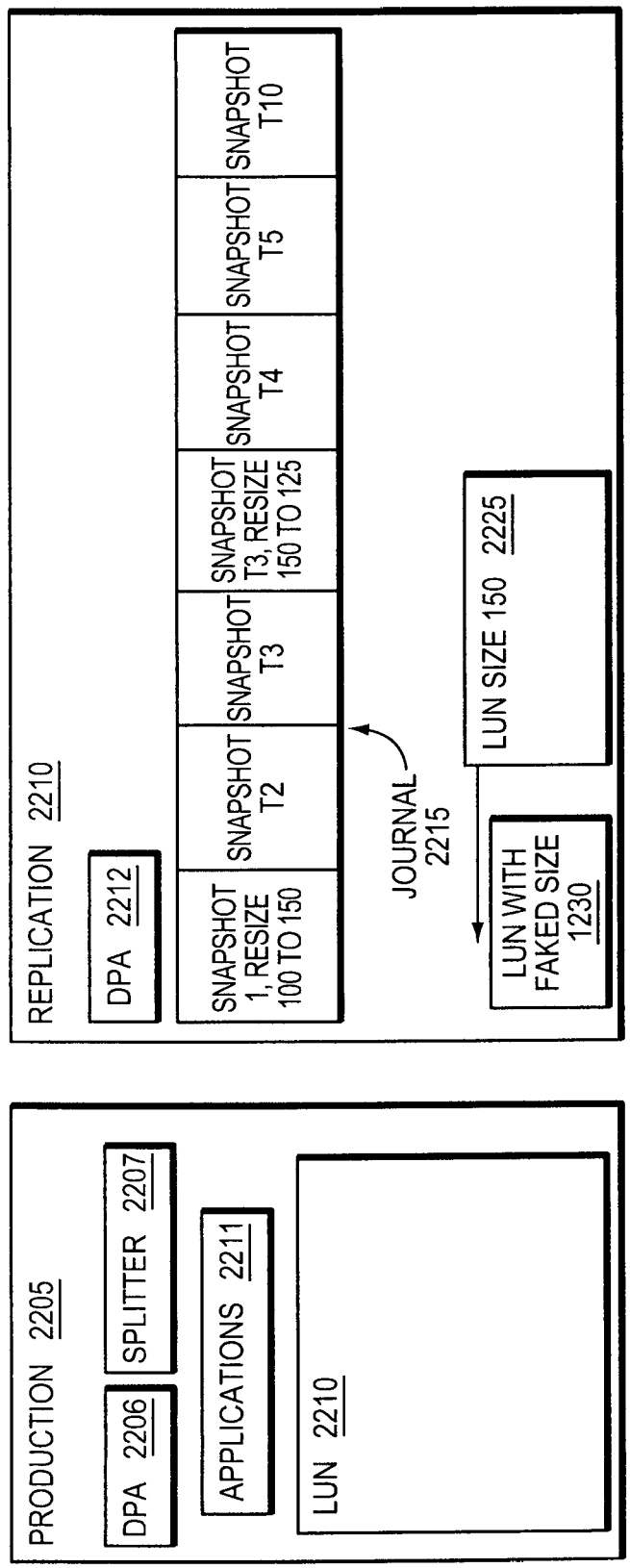
FIG. 22 is a simplified illustration of a data protection system illustrating presentation of a LUN with a faked size based on data from the journal, in accordance with an embodiment of the present invention.
Figure 23:
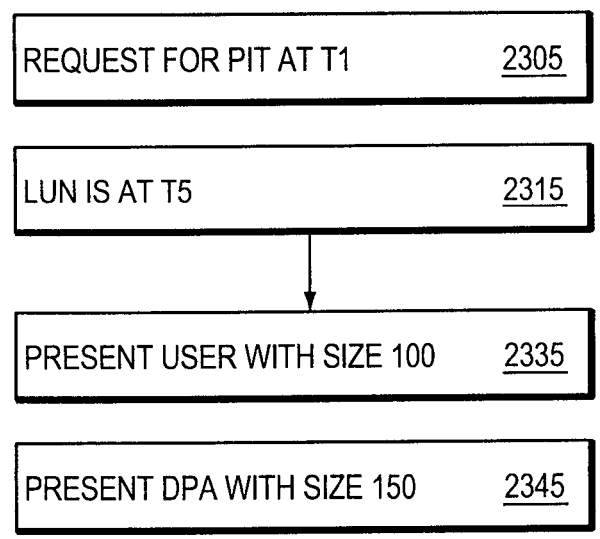
FIG. 23 is an alternative simplified method for rolling to a point in time, in accordance with an embodiment of the present invention.

For example, refer to then embodiments of FIGS. 22 and 23. A request is made for a point in time at T1 (step 2305). The LUN is at T5 (step 2315). The user is presented with a LUN 1230 of size 100 (step 2335). The DPA is presented with size LUN 2225 at size 150 (step 2340).

In certain embodiments, it may be necessary to failover the production site to the replication site. In an embodiment where the user wants to fail over, the original production size may be smaller than the replica volume. In this embodiment, the replication may not start until the production LUN is increased to be at least as big as the replica LUN. In certain embodiments, the new area added to the LUN may be added to the marking stream and resynchronized.

Figure 24:
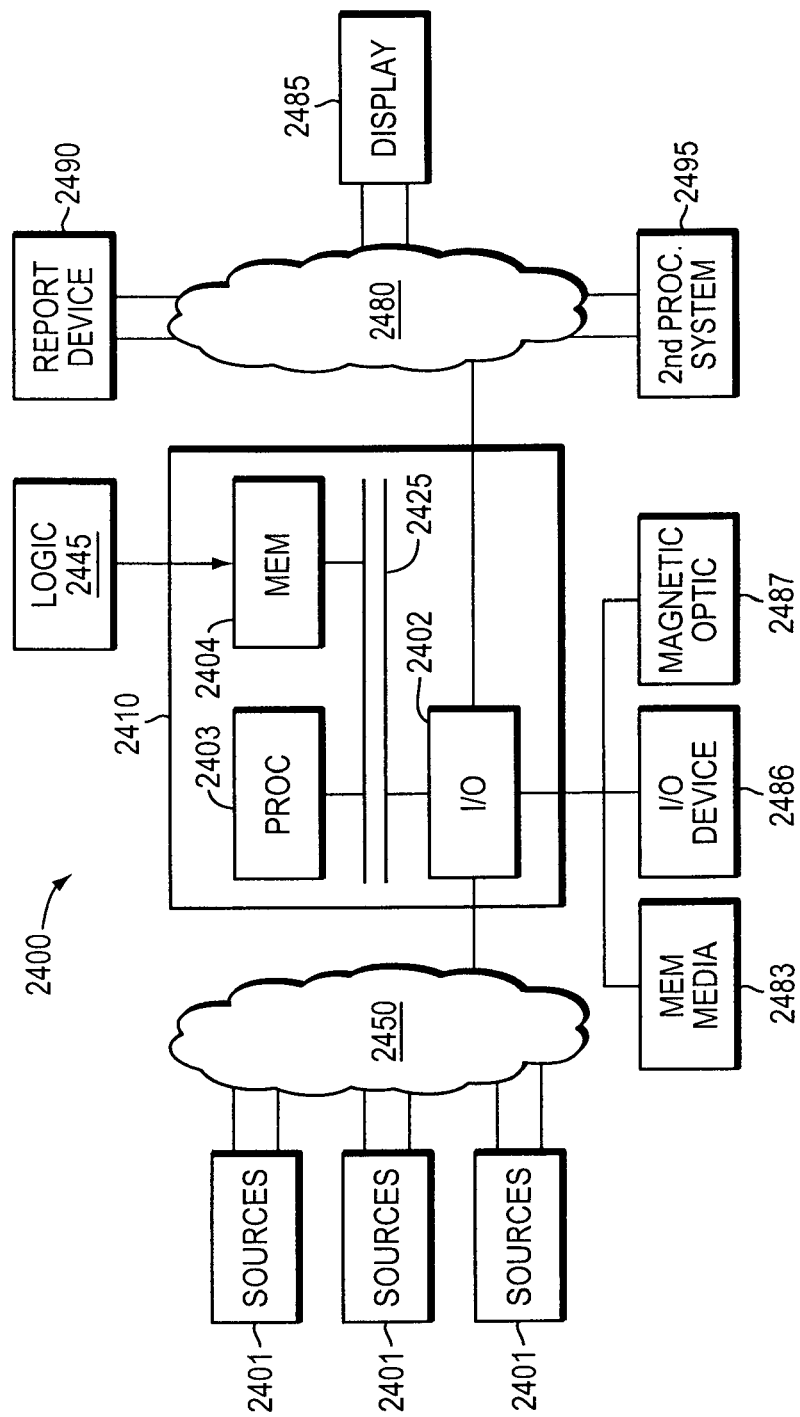
FIG. 24 shows an embodiment of the current invention as loaded on a computer.
Figure 25:
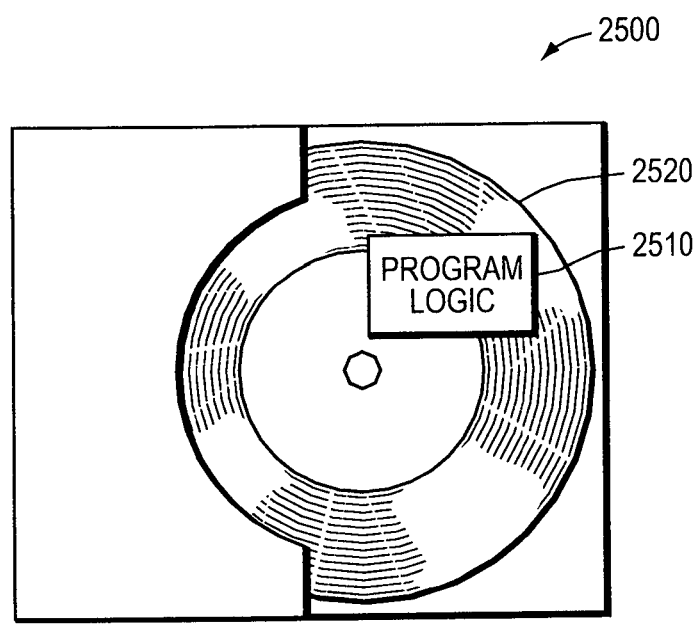
FIG. 25 shows an embodiment of a method of the current invention embodied as program code or a program product.

The methods and apparatus of this invention may take the form, at least partially, of program code (i.e., instructions) embodied in tangible, non-transitory, media, such as floppy diskettes, CD-ROMs, hard drives, random access or read only-memory, or any other machine-readable storage medium. When the program code, such as Logic 2445 of FIG. 24, is loaded into and executed by a machine, such as the computer of FIG. 1 or FIG. 24, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 25 shows Program Logic 2510 embodied on a computer-readable medium 2530 as shown, and wherein the Logic is encoded in computer-executable code configured for carrying out the reservation service process of this invention and thereby forming a Computer Program Product 2500.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for dynamically changing the size of a LUN in a replication based environment, the replication based environment having a splitter, a production site and a replication site, the production site having a production LUN (Logical Unit Number), the replication site having a journal and a replication LUN, the method comprising:

changing the size of the production LUN based on a request to change the size of the production LUN on the production site;
determining on the replication site that the production LUN has changed size;
determining whether it is possible to change the size of the replication LUN;
wherein the determination of whether it is possible to change the replication LUN is negative when the size of the changed production LUN is smaller than the size of any corresponding point in time enabled by the replication based environment for the replication LUN;
based on a negative determination and in response to a request for the replication LUN, pausing replication and
based on a positive determination, changing or faking the size of the replication LUN;
determining if there are applications replicated that are dependent on the size of the production LUN;
based a positive determination, performing application pre-LUN increase activity; and
performing, based on the positive determination, post-LUN increase activity;
scanning the journal to determine the maximum size of the replication LUN in the journal;
determining if the maximum size of the replication LUN in the journal is less than size of the replication LUN; and
based on a positive determination, reducing the size of the replication LUN.

2. The method of claim 1 wherein the change is a request to increase the size of the production LUN.

3. The method of claim 2 further comprising: moving the splitter to marking mode.

4. The method of claim 2 further comprising: determining if the production and replication LUNs are identical in the increased area of the replication LUN; based on a determination that the production and replication LUNs are not identical, marking the new areas of the replication LUN as dirty.

5. The method of claim 2 further comprising: determining if the production and replication LUN are thin LUNs; and based on a negative determination marking area as dirty in a delta marking stream.

6. The method of claim 1 wherein the request is a request to decrease the size of the production LUN.

7. The method of claim 6 further comprising:
performing application LUN pre-decrease work;
and performing application post LUN increase work.

8. The method of claim 6 wherein a splitter intercepts the production LUN decrease request and further comprising: moving the splitter to marking mode.

9. The method of claim 1 wherein the determining of a change of the production site is based on a notification sent to the replication protection appliance.

10. The method of claim 1 wherein the determining of a change on the production site is based on a periodic check of the replication LUN sizes and wherein, based on a determination of a change, snapshots of invalid size in the journal marked as invalid.

11. The method of claim 1, wherein a change in the size of the production LUN is recorded in the journal on the replication site.

12. A system for dynamically changing the size of a LUN in a replication based environment, the system comprising:
a computer memory;
a splitter;
a production site having a production LUN;
a replication site having a journal and a replication LUN;
computer-executable logic operating in the computer memory, wherein the computer-executable logic is configured for execution of the following:
changing the size of the production LUN based on a request to change the size of the production LUN;
determining on the replication site that the production LUN has changed size;
determining whether it is possible to change the size of the replication LUN;
wherein the determination of whether it is possible to change the replication LUN is negative when the size of the changed production LUN is smaller than the size of any corresponding point in time enabled by the replication based environment for the replication LUN;
based on a negative determination and in response to a request for the replication LUN, pausing replication and
based on a positive determination, changing or faking the size of the replication LUN;
determining if there are applications replicated that are dependent on the size of the production LUN;
based a positive determination, performing application pre-LUN increase activity; and
performing, based on the positive determination, post-LUN increase activity;
scanning the journal to determine the maximum size of the replication LUN in the journal;
determining if the maximum size of the replication LUN in the journal is less than size of the replication LUN; and
based on a positive determination, reducing the size of the replication LUN.

13. The system of claim 12 wherein the change is a request to increase the size of the production LUN.

14. The system of claim 12 wherein the request is a request to decrease the size of the replication LUN.

15. A computer program product comprising:
a non-transitory computer readable medium encoded with computer executable program code for dynamically changing the size of a LUN in a replication based environment, the replication based environment having a splitter, a production site and a replication site, the production site having a production LUN (Logical Unit Number), the replication site having a journal and a replication LUN, the code enabling:
changing the size of the production LUN based on a request to change the size of the production LUN;
determining on the replication site that the production LUN has changed size;
determining whether it is possible to change the size of the replication LUN;
wherein the determination of whether it is possible to change the replication LUN is negative when the size of the changed production LUN is smaller than the size of any corresponding point in time enabled by the replication based environment for the replication LUN;
based on a negative determination and in response to a request for the replication LUN, pausing replication and
based on a positive determination, changing or faking the size of the replication LUN;
determining if there are applications replicated that are dependent on the size of the production LUN;
based a positive determination, performing application pre-LUN increase activity; and
performing, based on the positive determination, post-LUN increase activity;
scanning the journal to determine the maximum size of the replication LUN in the journal;

determining if the maximum size of the replication LUN in the journal is less than size of the replication LUN; and based on a positive determination, reducing the size of the replication LUN.

16. The computer program product of claim 15 wherein the request is a request to decrease the size of the replication LUN.

17. The computer program product of claim 15 wherein the change is a request to increase the size of the production LUN.

\* \* \* \* \*